(No Model.) 4 Sheets—Sheet 1.

J. ADT.
MACHINE FOR MAKING COTTER PINS.

No. 330,661. Patented Nov. 17, 1885.

Witnesses.

John Adt, Inventor (No Model.)  4 Sheets—Sheet 2.
J. ADT.
MACHINE FOR MAKING COTTER PINS.
No. 330,661.  Patented Nov. 17, 1885.
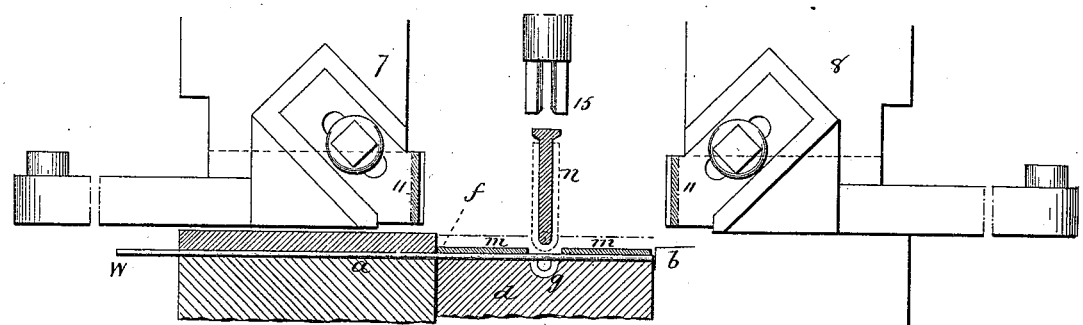
Fig. 3.
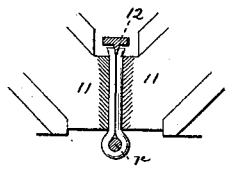
Fig. 5.
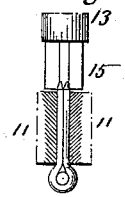
Fig. 6.
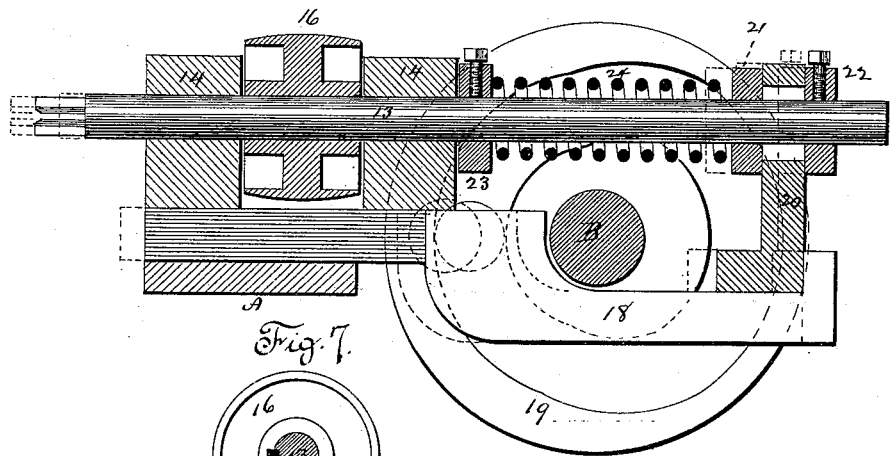
Fig. 4.
Fig. 7.
Witnesses.
J. H. Shumway
Fred C. Earle
John Adt,
Inventor.
By Atty.

(No Model.) 4 Sheets—Sheet 3.
J. ADT.
MACHINE FOR MAKING COTTER PINS.
No. 330,661. Patented Nov. 17, 1885.
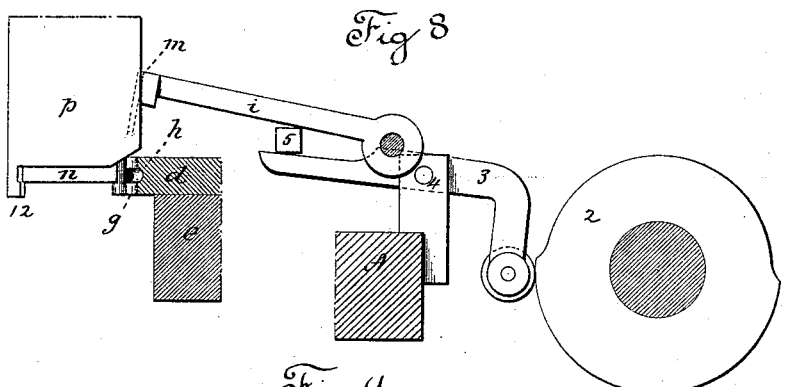
Fig. 8
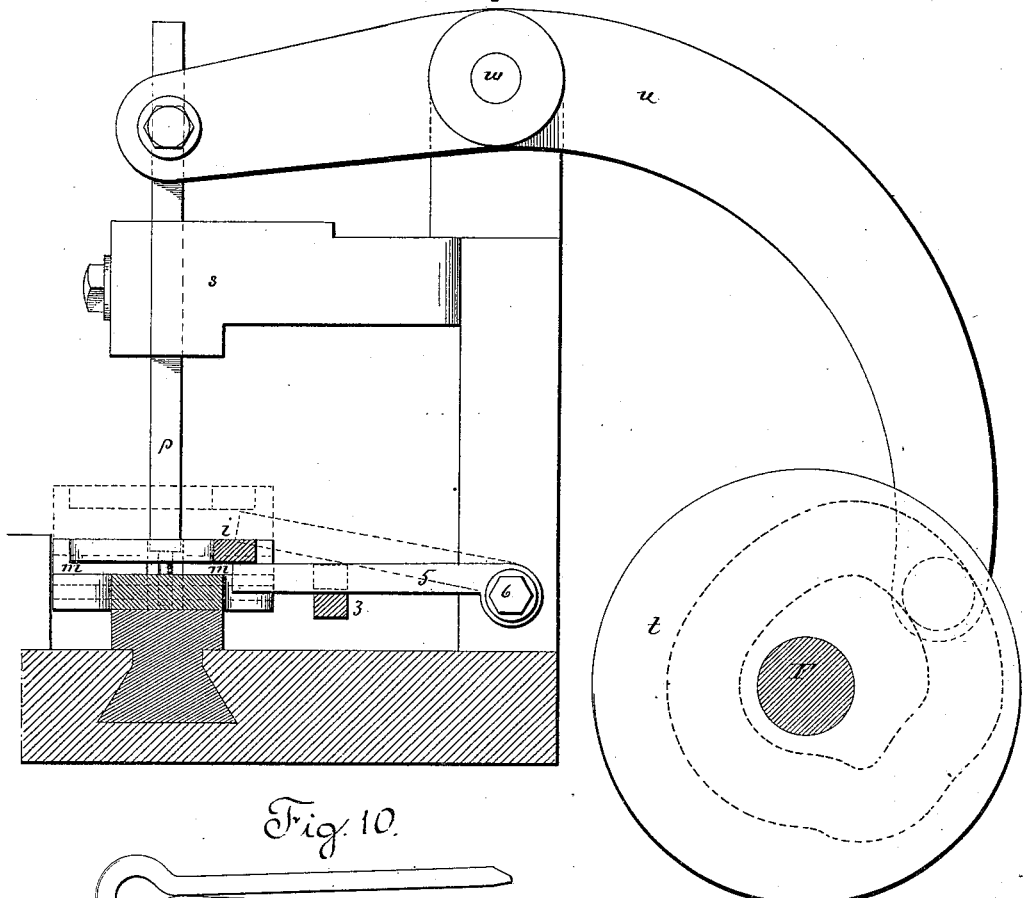
Fig. 4
Fig. 10
Witnesses.
J. H. Shumway
Fred C. Earle
John Adt.
Inventor.
By Atty.

UNITED STATES PATENT OFFICE.

JOHN ADT, OF NEW HAVEN, CONNECTICUT.

MACHINE FOR MAKING COTTER-PINS.

SPECIFICATION forming part of Letters Patent No. 330,661, dated November 17, 1885.

Application filed September 25, 1885. Serial No. 178,133. (No model.)

*To all whom it may concern:*

Be it known that I, JOHN ADT, of New Haven, in the county of New Haven and State of Connecticut, have invented a new Improvement in Machines for Making Cotter-Pins; and I do hereby declare the following, when taken in connection with accompanying drawings, and the letters of reference marked thereon, to be a full, clear, and exact description of the same, and which said drawings constitute part of this specification, and represent, in—

Figure 1:
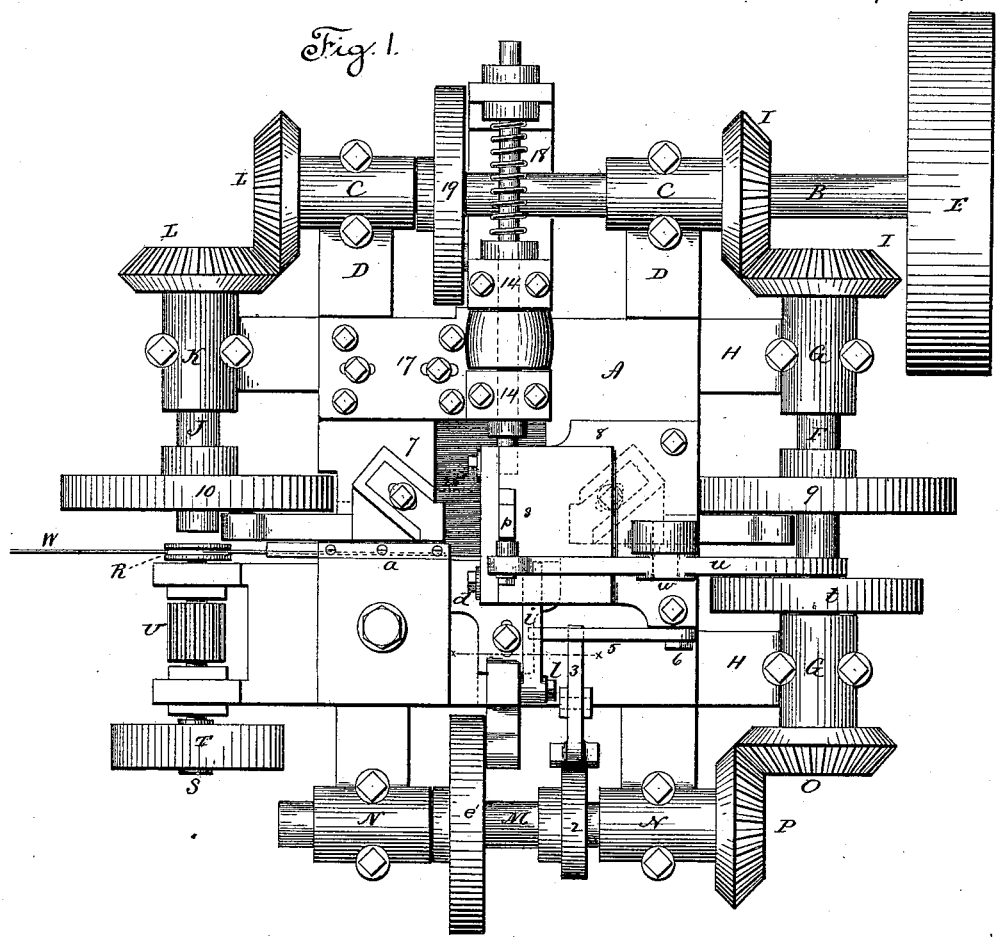
Figure 2:
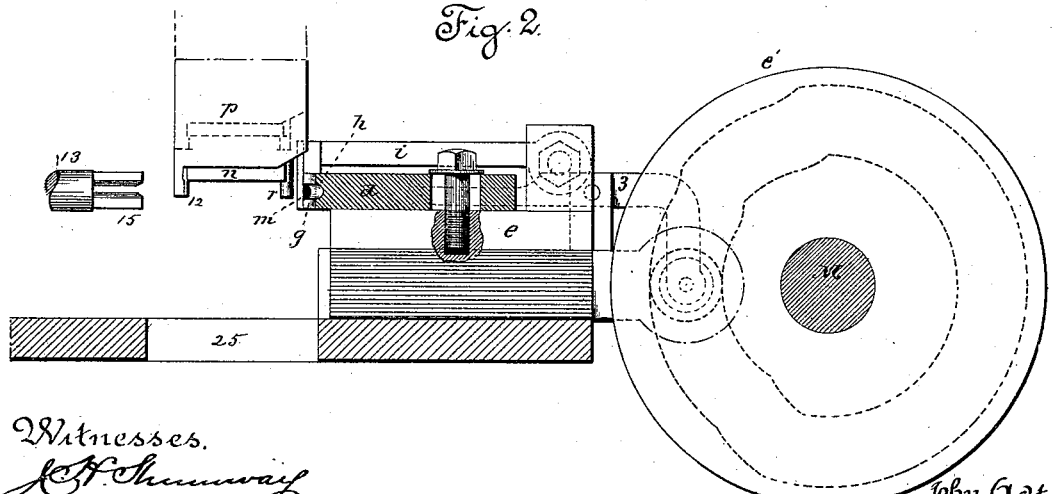
Figure 11:
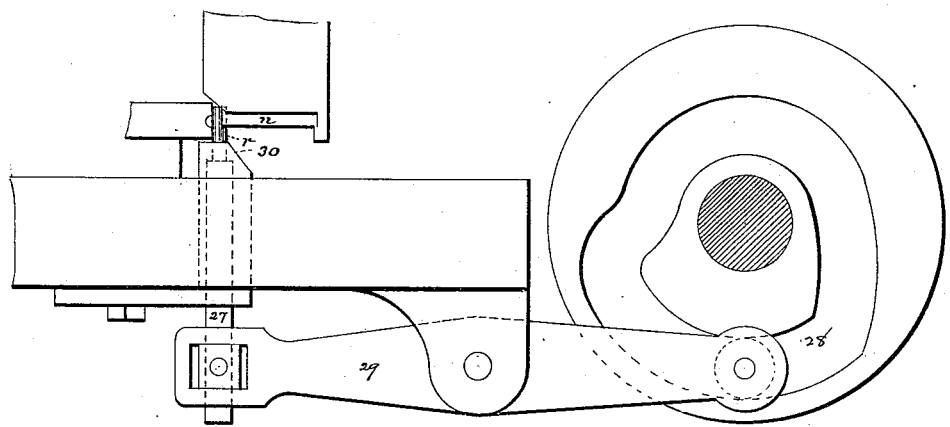

Figure 1, a top or plan view; Fig. 2, a vertical central longitudinal section through the bender $d$, showing side view of the former, and also showing a portion of the mill; Fig. 3, a horizontal section cutting through the wire guide and bender in the plane of the wire fed into the machine and with the former, showing also the side benders in partial section and the working end of the pointing-spindle; Fig. 4, a longitudinal vertical central section through the spindle mechanism, showing side view of the spindle; Fig. 5, a horizontal section through the side benders, the bender-stud, and wedge-shaped projection, showing the pin as completely bent; Fig. 6, the same section through the benders, showing the mill as having performed its work on the point; Fig. 7, a section through the mill-spindle, showing its connection with the driving-pulley; Fig. 8, a central vertical section through the bender $d$, showing side view of the former and the fingers as raised from their position before the bender; Fig. 9, a section on line $x\ x$ of Fig. 1 cutting through the first bender-slide, and showing side view of the slide P, which carries the former and its connecting-lever; Fig. 10, the pin complete, all the figures except Fig. 1 enlarged; Fig. 11, a modification in the arrangement of the cylindrical stud $r$.

This invention relates to an improvement in machines for making the article known as "cotter-pins"—that is to say, a device made from a piece of wire bent midway of its length to form an eye, the two legs brought nearly together, and so that the two legs may be sprung together, and introduced through a hole, as in the end of an axle, and then the legs, opening by their own elasticity, serve to retain the pin in place and secure whatever it may be on the axle, the object of the invention being the construction of a machine which will automatically receive the wire, cut the blank, bend it to shape, finish and discharge the finished pin from the machine; and the invention consists in the construction and combination of parts, as hereinafter described, and more particularly recited in the claims.

A represents the bed of the machine, on which the operative mechanism is placed; B, the principal driving-shaft, through which the power is communicated, arranged in bearings C C on brackets D, extending from the bed, power being communicated to the shaft through a pulley, E, or other usual method of communicating power to a driving-shaft.

On one side of the machine is a second shaft, F, at right angles to the driving-shaft, supported in bearings G on brackets H extending from that side of the bed. This shaft receives rotation from the driving-shaft by means of bevel-gears I I.

On the opposite side of the machine is a similar shaft, J, supported in bearings K and in line at right angles to the driving-shaft, and receiving rotation from the driving-shaft through bevel-gears L L.

On the opposite side of the machine to the driving-shaft is a fourth shaft, M, parallel with the driving-shaft, supported in bearings N and receiving rotation through a pinion, O, on the shaft F and a like pinion, P, on the shaft M, and so that the said four shafts receive simultaneous rotation from the driving-shaft B as if one common shaft, and from the cams on these shafts the operative parts receive their proper movements.

The feed for the wire, as here represented, is what is called a "roller-feed;" and it consists of a pair of rolls, one above another, R representing the upper roll, the under roll being the same, but not shown. Each roll is arranged upon an independent shaft, and to the shaft S of, say, the upper roll, power is applied through a pulley, T, or otherwise, and the two shafts are geared together by pinions U, the pinion on the upper shaft only being shown, and so that the feed-rolls receive a constant and uniform rotation, the wire standing in the groove between the two rolls, and so that if the wire be free the friction of the two rolls on the wire will cause it to advance or run into the machine; but if the advance of the wire be stopped, then the rolls will slip upon the surface of the wire, a common and well-known wire-feeding mechanism. W represents the wire as running through the feed-rolls and entering a guide, $a$, as indicated in broken lines, Fig. 1, and as also seen in Fig. 3. The wire thus fed in runs until it meets a stop, $b$, distant from the inner end of the guide $a$ the length of the blank required to form the pin, and as seen in Fig. 3.

$d$ is the preliminary bender, secured to a slide, $e$, arranged in guides on the bed of the machine, and so as to receive a reciprocating movement forward and back, such movement being derived from a grooved cam, $e'$, on the shaft M. (See Fig. 2.) This bender stands in the plane of the wire as the wire is introduced to the machine, one edge of the said bender running close to the inner end of the guide $a$, as seen in Fig. 3, and so that as the bender advances its edge at $f$, working across that end of the guide $a$, will cut the wire and separate the blank therefrom, in like manner as blanks are separated in other wire-working machines.

Vertically in the face of the bender is a semicircular recess, $g$, (see Fig. 3,) and longitudinally across the face and through said recess $g$ is a semicircular groove, $h$, corresponding to the blank. It will be understood that the wire from which the blanks are cut is usually semi-cylindrical, and so that the cylindrical surface will be presented toward the bender $d$, the flat surface forward, and as seen in Fig. 2, solid black indicating the blank.

On the slide $e$, which carries the bender $d$, a lever, $i$, is hung upon a pivot, $l$, and so as to swing in a vertical plane. The lever extends forward, and at its free end carries fingers $m$, which when the lever is down, as seen in Fig. 2, stand in front of the groove in the bender, and so that the wire will enter its groove $h$ in rear of the fingers, and so that after the blank is separated from the wire the fingers will serve to retain the blank in the groove of the bender $d$, and as indicated in Fig. 2. Thus held, the slide $e$ is advanced, carrying the bender forward to the former for the preliminary bend.

The former $n$ (see Fig. 3) is attached to or formed upon the lower end of a slide, $p$. (See Fig. 8.) The former $n$ is rounded at its end next the bender $d$, corresponding to the bend required for the double of the pin, and from that edge forward its sides are parallel, as seen in Fig. 3; but at the end next the bender there is a downwardly-projecting cylindrical stud, $r$, (see Fig. 2,) which corresponds to the eye-like shape of the finished pin.

The slide $p$ is arranged in a vertical support, $s$, (see Fig. 9,) and so as to be moved up and down therein, such up-and-down reciprocating movement being imparted to it by a cam, $t$, on the shaft F, through a lever, $u$, hung upon a fulcrum, $w$.

As the bender $d$ advances with the blank which it has cut from the wire to the position indicated in broken lines, Fig. 3, the former $n$ then stands in its down position, and in the plane of the groove in the former, as seen in Fig. 8. The bender advances with the fingers $m$ $m$ supporting the wire until the wire arrives into contact with the rounded end of the bender $n$. Then the fingers are raised from their holding position, as seen in Fig. 8. This raising movement is imparted to the fingers by means of a cam, 2, on the shaft M, through a lever, 3, which is hung upon a fulcrum, 4, on the bed of the machine, this lever 3 working beneath a second lever, 5, arranged at right angles thereto, and hung upon a pivot, 6, (see Figs. 1 and 9,) its free end extending beneath the finger-lever $i$, and so that as the cam 2 depresses the one arm of the lever 3 its other arm rises and imparts an upward movement to the lever $i$, as seen in Fig. 8. Then, when the cam permits, the lever 3 drops, permitting the lever $i$ also to drop to the position seen in Fig. 2. After the fingers have been thus removed from their support to the wire the bender $d$ still advances and forces the blank upon the bender, the groove $g$ in the bender turning the two legs around to the sides of the bender, as indicated in broken lines, Fig. 3, thus bending the blank into U shape, and there the bender $d$ rests.

In the same plane as the bender $d$ two slides, 7 and 8, are arranged opposite each other, as seen in Fig. 8, and in guides at right angles to the path of movement of the bender $d$, also seen in Fig. 1. The slide 8 receives reciprocating movement from a grooved cam, 9, on the shaft F, and the slide 7 receives a corresponding reciprocating movement from a cam, 10, on the shaft J, the movement of the two shafts being equal and simultaneous. These slides each carry a side bender, 11, the working-face of each of the benders adapted to embrace the respective legs of the U-shaped blank previously bent.

After the preliminary bend is produced by the bender $d$ the slide $p$ rises to take the former $n$ out of the plane of the legs of the blank, and, as seen in Fig. 2, bringing the cylindrical stud $r$ up into the plane which the former $n$ previously occupied. Then the two benders 11 11 are advanced and come against the respective legs of the blank, bringing them together and bending them at the stud $r$, as seen in Fig. 5, to form the eye, or what may be called the "handle," of the pin.

It is desirable that the meeting ends of the pin shall have a V-shaped recess between them, as seen in Fig. 10. This is desirable, not to say necessary, in order that after the pin shall have been inserted through the hole prepared for it the ends may be spread to prevent the accidental escape or removal of the pin.

In order to form such V-shaped opening at the points, I construct the former with a downward projection, 12, at its end opposite the stud $r$, as seen in Fig. 2, and also seen in Fig. 5, the said projection being wedge-shaped in horizontal section, the apex toward the stud $r$, and so that as the two legs are brought together, as seen in Fig. 5, the benders being somewhat less in length than the length of the legs will bring the end portions of the legs on opposite sides of the wedge-shaped projection 12, and in closing the legs upon each other will produce an outward bend at the end of the two legs, as seen in Fig. 5, such bend producing the required recess between the legs of the pin.

It is necessary to reduce the legs at the ends into conical shape, so that they may be readily inserted into the hole prepared for them. This I propose to do by milling or cutting away the metal thrown out by the bends at the ends of the legs. To this end I arrange a yielding spindle, 13, in bearings 14, so as to move freely and longitudinally therein, and also free for rotation, the said spindle being arranged in axial line with the pin as it stands after the final bend, as seen in Fig. 5. This spindle carries at its inner end a mill, 15, adapted to cut the metal from the ends of the legs and bring it to the required conical shape. Rotation is imparted to the spindle 13 by a pulley, 16, between the bearings 14 14, as seen in Fig. 4, the pulley being splined to the shaft, as seen in Fig. 7, so that while it permits longitudinal movement of the spindle through it it imparts to the spindle its own rotary movement.

The bearings 14 14 are made a part of a bracket, 17, fixed to the bed. In the longitudinal line of the spindle is a slide, 18, (see Fig. 4,) which receives a reciprocating movement from a grooved cam, 19, on the shaft B. At the rear end of the slide 18 is an upright, 20, through which the spindle 13 extends, and upon the spindle, on the advancing side of the upright 20, is a loose collar, 21, and a like collar, 22, on the reverse side, fixed to the spindle, and on the spindle in advance of the loose collar 21 is a fixed collar, 23, and between the fixed collar 23 and the loose collar is a spring, 24, and so that as the slide 18 advances it brings the pressure of the spring 24 against the fixed collar 23, and thereby forces the spindle forward under the pressure of the said spring 24, and on the return of the slide 18 the retreating movement of the slide is imparted to the spindle through the fixed collar 22, so that the advance movement of the slide is imparted to the spindle through the spring 24. Such forward movement of the spindle carries the mill 15 to the projecting ends of the legs of the pin, and cuts away the metal to produce the conical point, as seen in Fig. 13. Before the mill has reached the ends of the legs the slide P rises, as seen in broken lines, Fig. 2, to take the projection 12 and the stud r from the blank, leaving the blank only held by the side benders, 11, as seen in Fig. 6, and the projection 12 out of the path of the advancing mill. After the mill has done its work it retreats. Then the side benders separate, leaving the pin free to fall through an opening, 25, in the bed of the machine, and the parts are ready for the second operation, and so continuing cutting successive blanks from the wire, bending, finishing, and discharging the pin.

The object of communicating the power to the spindle 13 through the spring 24 is that it may adapt itself to the work it is to do— that is to say, as the slide advances the spindle the resistance of the pin to such advance will be met by the spring, and the spring will yield to such resistance of the pin until as the work of pointing proceeds the spring may force the spindle forward, and if perchance there should be considerable variation in the length of the pins the spindle will only advance under the action of the spring, and without regard to the advance of the slide which carries it, so that variations of the length of the pin will not interfere with the proper working of the mill. The collar 23 will serve as a stop to bring up against the bearing 14, as indicated in Fig. 4, when the work is complete, and the spindle will be thus supported with the stop against the said bearing, excepting as resistance is applied by the pin to the advancement of the spindle.

In cases where it is not desirable to perform the pointing of the pin in the machine, or where it is not desirable to point the pin at all, the pointing-spindle may be omitted.

The downward projection 12 may be dispensed with in cases where the recess between the ends of the two legs is not required.

I have illustrated but one well-known feed for delivering the wire to the machine. It will be understood by those skilled in the art that any of the known feeds for feeding wire may be employed, such feeds being too well known to require illustration or description; or, instead of feeding the blanks and cutting them directly from the wire, they may be otherwise cut and fed individually, as in well-known machines for making wire articles.

The longitudinally-reciprocating spindle carrying the mill may be employed in other machines for making cotter-pins, and whereby the point may be milled while in the machine. I therefore do not wish to be understood as limiting the combination of the mill to the specific devices for bending or shaping the pin.

I have represented the cylindrical stud r around which the blank is bent as made a part of or an extension from the former, and so as to move with the slide which carries the former; but it may be made independent of the former n, and arranged to move downward instead of up; also independent of the former, and as seen in Fig. 11. In this case the stud r is arranged in a vertical slide, 27, and to which a vertical movement is imparted by means of a cam, 28, on either of the shafts, through a lever, 29. In such case the stud is in its up position at its first bend—that is, when the blank is brought into the U shape— and remains until after the final operation, and then is drawn downward by the action of the cam, and from the eye in the pin. The bent end of the pin striking a stop, 30, as the pin is drawn down, permits the stud to escape from the pin and leave the pin free to fall from the machine.

I claim—

1. In a machine for making cotter-pins, the combination of a feed adapted to present the wire into the machine in position for bending, a bender, d, constructed with a semicircular recess, g, in its face, and with a longitudinal groove, h, extending through said semicircular recess, a former, n, in line with the said recess in the face of the bender and arranged for vertical movement at right angles to the plane of said bender, and the cylindrical stud r at the end of the former next the bender, the said former and stud adapted to be successively brought into the plane of the groove in said bender, and the reciprocating side benders, 11 11, substantially as described.

2. In a machine for making cotter-pins, the combination of a feed adapted to present the wire into the machine in position for bending, a bender, d, constructed with a semicircular recess, g, in its face, with a longitudinal groove, h, extending through said semi-circular recess, a former, n, in line with the said recess in the face of the bender and arranged for vertical movement at right angles to the plane of said bender, the said former constructed with a cylindrical downwardly-projecting stud, r, at its end next said bender d, the said former and stud adapted to be successively brought into the plane of the groove in the said bender d, and the reciprocating side benders, 11 11, substantially as described.

3. In a machine for making cotter-pins, the combination of a feeding device adapted to present the wire into the machine in position for bending, a reciprocating bender, d, constructed with a recess, g, in its face, and with a longitudinal groove, h, in its face extending through the said recess, fingers m, having an up-and-down movement imparted thereto and adapted to cover or uncover the said groove in the bender, a former, n, in line with the said central recess in the bender and arranged in a slide, whereby up-and-down movement may be imparted to said former, the said former also constructed with a downwardly-projecting cylindrical stud, r, at its end next the said bender d, the said former and stud adapted to be successively presented in the plane of the said groove in the said bender, and the reciprocating side benders, 11 11, substantially as described.

4. The combination of the bender d, constructed with a longitudinal groove, h, on its face, and with a semicircular bend in said groove at its center, the said groove adapted to receive a blank from which a pin is to be formed, a former, n, in line with said central recess in the bender and provided with a downwardly-projecting cylindrical stud, r, at its end next said bender d, the said former and stud arranged in a vertical movable slide, whereby the said bender and stud may be successively presented in the plane of said groove, the said former also provided with a downward projection, 12, at its end opposite said stud, the said projection having its edge toward the said stud wedge-shaped, with the apex toward the said stud, and the side benders, 11 11, substantially as described.

5. The combination of the reciprocating bender d, fingers m m, former n, provided at one end with the stud r, and at its opposite end with the downward wedge-shaped projection 12, and the reciprocating side benders, 11 11, substantially as described.

6. The combination of the reciprocating bender d, its front face adapted to receive a blank from which the pin is to be formed, and constructed with a semicircular recess at its center, the former n, forward of said bender and in line with said recess, the said former constructed with a downward cylindrical projection, r, the said former and projection arranged for vertical movement, and whereby the said former and stud are successively presented into the plane of said bender, side benders, 11 11, and the longitudinal reciprocating revolving spindle 13, carrying a mill at its inner end adapted to point the legs of the pin after bending, substantially as described.

7. The combination of the reciprocating bender d, its front face adapted to receive a blank from which the pin is to be formed, and with a semicircular recess in the center of its face, fingers m m, arranged to work up and down in front of the face of said bender, the former n, arranged in line with the said recess in the bender, and having the downwardly-projecting stud r at its end next said bender, the reciprocating side benders, 11 11, and the reciprocating revolving spindle 13, carrying a mill at its inner end adapted to point the ends of the legs of the pin after it is bent, substantially as described.

8. The combination of the reciprocating bender d, its front face adapted to receive a blank from which the pin is to be formed, and also having a central semicircular recess in its face, the former n in line with the said central recess in the bender, provided with the stud r at its end next said former, and with a downward projection, 12, at its opposite end, the inner edge of said projection 12 wedge-shaped, the side benders, 11 11, and the reciprocating revolving spindle 13, arranged in the plane of said bender, and carrying at its inner end the mill adapted to cut away the ends of the pin after bending, substantially as described.

9. In a machine for making cotter-pins, the combination of the mechanism, substantially such as described, for bending the pin, with a longitudinal reciprocating and revolving spindle arranged in axial line with the pin after it is bent, and carrying at its inner end a mill, substantially as described, and whereby the point of the bent pin will be cut into conical shape.

JOHN ADT.

Witnesses:
JOHN E. EARLE,
FRED C. EARLE.